2,888,483

HYDRAZINIUM HYDRAZINESULFINATES

Bernard Rudner, Pittsburgh, Pa., and Marguerite E. Brooks, Baltimore, Md., assignors to W. R. Grace & Co., New York, N.Y., a corporation of Connecticut No Drawing. Application September 16, 1958
Serial No. 761,294

13 Claims. (Cl. 260—501)

This invention relates to the reaction of organic substituted hydrazines with sulfur dioxide. In one specific aspect, it relates to a novel process for making organic substituted hydrazinium hydrazinesulfinates. In yet another aspect, it relates to the novel compositions of matter produced thereby.

The reaction of sulfur compounds with compounds containing two adjacent nitrogen atoms is not new to the art. The useful and well known sulfonhydrazides are made by the reaction of sulfonyl halides on hydrazine or substituted hydrazines. Phenylhydrazine has been prepared for many years by the reduction of phenyldiazonium salts with sulfur dioxide usually in the form of the alkali metal sulfite. Hydrazine itself is known to interact with sulfur dioxide to form an unusual compound containing three hydrazines to two sulfur dioxides. We have discovered, however, that the reaction of sulfur dioxide with organic substituted hydrazines unexpectedly gives the novel organic substituted hydrazinium hydrazinesulfinates.

It is, therefore, an object of the present invention to provide a new generic class of organic compounds, heretofore unavailable, useful as bactericides, fungicides and nematocides as well as for a variety of other purposes.

In accordance with the present invention, we have discovered a novel process for the synthesis of organic substituted hydrazinium hydrazinesulfinates having the general formula $(RR'NHNH_2)(RR'NNHSO_2)$. In this formula R is a monovalent radical selected from the group consisting of lower alkyl, hydroxy lower alkyl, phenyl and benzyl. R' is a monovalent radical selected from the group consisting of hydrogen, lower alkyl and benzyl. It is apparent that our novel compounds are salts containing the 2- or 2,2-substituted hydrazinium cation $(RR'NHNH_2)^+$ and the corresponding 2- or 2,2-substituted hydrazinesulfinate anion $(RR'NNHSO_2)^-$.

A brief discussion of the chemical and physical properties of these compounds will be required in order to better understand the method used for their production. Usually our novel compounds are insoluble in hydrocarbon solvents and moderately polar organic solvents. They are soluble in water and highly polar organic solvents. On heating, the compounds dissolve in less polar solvents but heating above 50° C. in any solvent may cause decomposition of the salt. Naturally the exact temperature at which decomposition becomes undesirable depends on the given salt and the solvent used. It is important to note that certain of our compounds, when in solution or wet with solvent, are particularly susceptible to air oxidation. When such a product is collected by filtration using suction to aid in the filtration and to promote drying or removal of solvent from the filter cake, oxidation of the product will result as air is pulled through the wet cake. When this occurs, suction-filtration should be done under a rubber dam or in an inert atmosphere.

Since the reaction of organic substituted hydrazines with sulfur dioxide is highly exothermic, excess substituted hydrazine must be present or preferably an inert solvent should be used. By inert it is meant that the solvent should be unreactive to the products or reactants of our invention during the course of the reaction process. Suitable solvents are aliphatic and aromatic hydrocarbons, chlorinated hydrocarbons, lower aliphatic alcohols, etc. Typical solvents used were xylene, trichloroethylene, chloroform, isopropyl alcohol and various petroleum hydrocarbon fractions. These remarks are meant to be illustrative of the types of solvents that may be used in our invention and are not meant to be limiting. Any unreactive or non-interfering solvent comes within the scope of our invention. The choice of the solvent is usually limited to one in which the reactant organic substituted hydrazine is soluble. A further choice of solvent is made depending on whether it is desirable to isolate the product as a solution (especially when it is particularly susceptible to decomposition in air) or to collect it by separation (liquid) or filtration (solid). In addition to the use of a solvent, it is necessary to provide means for externally cooling the reaction vessel. As mentioned and discussed previously, the reaction is highly exothermic and the product decomposes on heating in solution much above 50° C. From the above remarks it is also obvious that efficient operation of our process on a larger scale requires a means for adequate stirring of the reaction mixture at all stages of the process. This becomes particularly important at the latter stages of the process when the reaction mixture has become thickened with product.

Preferably our novel process is operated as follows: The selected organic substituted hydrazine is dissolved in a solvent in which the resultant hydrazinium hydrazinesulfinate will be insoluble. The stirred contents of the reaction vessel are chilled by external cooling and excess gaseous sulfur dioxide (from a cylinder protected by a trap) is passed into the reaction mixture. It is imperative to keep the temperature of the reaction mixture below 50° C. to avoid decomposition of the product and preferably below 30° C. to get a purer, lighter colored product. Temperature control is accomplished by the aforementioned cooling bath and by adjusting the rate of flow of sulfur dioxide into the reaction mixture. When the temperature starts rising, the flow rate is lessened to diminish the amount of heat formed by the exothermic reaction. The addition of sulfur dioxide is stopped when the reaction mixture becomes too thick for efficient stirring and/or further absorption of the gas ceases. The product is collected by filtration, using the precautions previously discussed, and dried in vacuo.

The novel compositions of our invention have been found useful as polymerization initiators and surprisingly as rodent repellants. Our hydrazinium hydrazine sulfinates have been tested and found useful as bactericides, fungicides and nematocides. Microbiological activity was tested by means of the Oxford Cup Method. The cups were placed on innoculated culture media, filled with buffered test solution and the whole incubated for the required time. In this method the zone of inhibition of microbial growth is a measure of the bacteriostatic or fungistatic activity of the given compound against the selected test organism. Using the appropriate culture media, tests were made of bacteriostatic activity against five representative bacterial species and of fungistatic activity against three selected species of fungi as described below:

FIVE TEST BACTERIA (1) *Micrococcus pyogenes*—can enter broken skin to cause infection also may cause food poisoning.

(2) *Pseudomonas aeroginosa*—a denitrifying organism which causes decay of protein.

(3) *Serratia marcescens*—a water-living saprophytic organism which reduces nitrates, liquefies blood serum and coagulates and digests milk.

(4) *Escherichia coli*—commonly found in the intestinal canal.

(5) *Klebsiella pneumoniae*—can cause infection of respiratory and genito-urinary tracts.

THREE TEST FUNGI (1) *Candida albicans*—has been known to cause acute fatal moniliases (lesions of the skin, mucous membranes and internal organs).

(2) *Microsporum gypseum*—causes skin diseases such as ring worm and barber's itch.

(3) *Chaetomium globosum*—causes deterioration of cellulosic materials.

The scope and utility of my invention is further illustrated by the following examples:

Example I

Dry sulfur dioxide gas was passed for 2 hours through a chilled solution of 20 g. of 1,1-dimethylhydrazine in 200 ml. of chloroform. A gelatinous supernatant layer appeared which was allowed to coagulate overnight before being collected by filtration under a rubber dam. On drying in a vacuum desiccator, the colorless solid appeared as long needles partially subliming at 28° C., melting 34–37° C. and evolving gas ca. 90° C. There resulted 7.7 g. of the product, 2,2-dimethylhydrazinium 2,2-dimethylhydrazinesulfinate.

Example II

Dry sulfur dioxide gas was passed for 2 hours through a chilled solution of 20 g. of methylhydrazine in 200 ml. of chloroform as in Example I. The reaction mixture separated into two liquid phases. The upper yellow layer was essentially 2-methylhydrazinium 2-methylhydrazinesulfinate unstable in the presence of air. When the same procedure was repeated using isopropyl alcohol as the solvent, a stable solution of the product was obtained.

Example III

Dry sulfur dioxide gas was passed for 2 hours through a chilled solution of 36 g. of phenylhydrazine in 200 ml. of trichloroethylene. A yellow solid formed immediately and on further standing additional solid precipitated. The crude product decomposing ca. 210° C. was collected in good yield by filtration under a rubber dam.

Example IV

Eighty grams of 1,1-dimethylhydrazine dissolved in 300 ml. of trichloroethylene was thoroughly chilled in an ice bath and kept cool during the 10 hour passage of sulfur dioxide into the reaction mixture. Working up the resultant 2,2-dimethylhydrazinium 2,2-dimethylhydrazinesulfinate according to the procedure of Example I, gave 134.6 g. of product.

Example V

Dry sulfur dioxide gas was bubbled through a solution of 35 g. of 2-hydroxyethylhydrazine in 1000 ml. of isopropyl alcohol for 30 minutes. Evaporation of the solvent left a yellow viscous liquid which contained some white crystalline solid. The residue was dissolved in methyl alcohol and added with stirring to an excess of ether forming two liquid layers. The yellow product layer was separated and dried to give 55 g. of a light yellow viscous liquid. The product, 2-(2-hydroxyethyl) hydrazinium 2-(2-hydroxyethyl)hydrazinesulfinate, decomposed at 40° C. and began to char ca. 100° C.; its aqueous solutions had a pH of 5.35.

Example VI

A flask containing 324 g. of phenylhydrazine dissolved in 1838 g. of xylene was kept in a water bath at about 20° C. After the addition with stirring of 338 g. of sulfur dioxide over a period of 97 minutes, the resultant slurry was allowed to stand several hours before being filtered under a rubber dam. (When an attempt was made to dry the filter cake by pulling air through it, the cake became very hot, began to smoke and started localized decomposition with pronounced charring.) On drying there was obtained 290 g. of 2-phenylhydrazinium 2-phenylhydrazinesulfinate as a pale yellow solid which decomposed ca. 225° C. At room temperature, the product was insoluble in ether, chloroform, water, lower alcohols, ethyl acetate, benzene and xylene; it was soluble in methyl alcohol, ethyl acetate and chloroform at 50° C. but at higher temperatures decomposition became extensive. The product analyzed 51.96% C, 6.28% H and 19.21% N as compared to the calculated values of 51.41, 5.75 and 19.99% respectively.

Example VII

Using the same general procedure as in the previous example, but without any stirring, 541 g. of phenylhydrazine in 1620 g. of xylene was treated with 282 g. of sulfur dioxide over a period of 71 minutes. A yield of 392 g. of dried product was obtained. As with the filtrate of the previous example, more product could be isolated by evaporation of the filtrate. Here it was found preferable to recycle the filtrate by recharging it with another 541 g. of phenylhydrazine and 306 g. of xylene. The passage of 262 g. of sulfur dioxide over a period of 55 minutes gave 483 g. of product after filtration and drying.

Example VIII 2-phenylhydrazinium 2-phenylhydrazinesulfinate, a typical compound of this invention, was tested in vitro by the Oxford cup method for bacteriostatic activity. Phenol and Zephiran (a refined benzalkonium chloride) were used as controls. In each experiment, three stainless steel Oxford cups (10 mm. in diameter) were placed equidistant on the innoculated culture medium in a Petri dish and the cups filled approximately three-quarters full with test solution containing 0.2% of the substance to be tested. After incubation for the appropriate period, the plates were examined and the diameter of the zone of the inhibition of microbial growth surrounding each cup measured. Obviously, the larger the zone of inhibition, the more effective are the bacteriostatic properties of the compound tested. Because of the size of the Oxford cups use, 10 mm. is considered to represent zero inhibition.

ZONE OF INHIBITION AT pH=3.0

| Organism | Media | Zephiran | Phenol | Sulfinate |
|---|---|---|---|---|
| 1. *M. pyogenes* | A | 21 | 10 | 14 |
| 2. *P. aeruginosa* | A | 10 | 10 | 12 |
| 3. *P. aeruginosa* | B | 10 | 10 | 10 |
| 4. *S. marascens* | A | 14 | 10 | 13 |
| 5. *E. coli* | A | 18 | 10 | 16 |
| 6. *K. pneumoniae* | B | 11 | 10 | 14 |
| 7. *K. pneumoniae* | A | 17 | 10 | 23 |

ZONE OF INHIBITION AT pH=7.0

| Organism | Media | Zephiran | Phenol | Sulfinate |
|---|---|---|---|---|
| 1. *M. pyogenes* | A | 21 | 10 | 16 |
| 2. *P. aeruginosa* | A | 10 | 10 | 14 |
| 3. *P. aeruginosa* | B | 10 | 10 | 14 |
| 4. *S. marascens* | A | 14 | 10 | 16 |
| 5. *E. coli* | A | 17 | 10 | 20 |
| 6. *K. pneumoniae* | B | 12 | 10 | 16 |
| 7. *K. pneumoniae* | A | 17 | 10 | 30 |

Media A: nutrient agar.
Media B: nutrient agar + 10% horse serum.

Example IX

Using the procedure of the previous example, the in vitro fungistatic activity of 2-phenylhydrazinium 2- phenylhydrazinesulfinate was tested by the Oxford cup method against Phenol and Zephiran as controls.

ZONE OF INHIBITION AT pH=3.0

| Organism | Media | Zephiran | Phenol | Sulfinate |
|---|---|---|---|---|
| 1. C. albicans | A | 15 | 10 | 27 |
| 2. C. albicans | B | 13 | 11 | 22 |
| 3. M. gypseum | A | 38 | 10 | 47 |
| 4. C. globosum | C | 28 | 11 | 24 |

ZONE OF INHIBITION AT pH=7.0

| Organism | Media | Zephiran | Phenol | Sulfinate |
|---|---|---|---|---|
| 1. C. albicans | A | 17 | 10 | 32 |
| 2. C. albicans | B | 12 | 10 | 24 |
| 3. M. gypseum | A | 35 | 10 | 24 |
| 4. C. globosum | C | 23 | 12 | 48 |

Media A: Sabourauds dextrose agar.
Media B: Sabourauds dextrose agar + 10% horse serum.
Media C: Potato agar.

We claim:

1. Chemical compounds having the general formula $(RR'NHNH_2)(RR'NNHSO_2)$ wherein R is a monovalent radical selected from the group consisting of lower alkyl, hydroxy lower alkyl, phenyl and benzyl and R' is a monovalent radical selected from the group consisting of lower alkyl hydroxy lower alkyl, phenyl and benzyl and R' is a monovalent radical selected from the group consisting of hydrogen, lower alkyl and benzyl.

2. Compounds according to claim 1 wherein R is hydroxy lower alkyl and R' is hydrogen.

3. Compounds according to claim 1 wherein R and R' are lower alkyl.

4. Compounds according to claim 1 wherein R is lower alkyl and R' is hydrogen.

5. 2,2-dimethylhydrazinium 2,2-dimethylhydrazinesulfinate.

6. 2-methylhydrazinium 2-methylhydrazinesulfinate.

7. 2-(2-hydroxyethyl)hydrazinium 2-(2-hydroxyethyl)hydrazinesulfinate.

8. 2-phenylhydrazinium 2-phenylhydrazinesulfinate.

9. A method of making organic substituted hydrazinium hydrazinesulfinates having the general formula $(RR'NHNH_2)(RR'NNHSO_2)$ wherein R is a monovalent radical selected from the group consisting of lower alkyl, hydroxy lower alkyl, phenyl and benzyl and R' is a monovalent radical selected from the group consisting of hydrogen, lower alkyl and benzyl which comprises providing a solution of an organic substituted hydrazine having the formula $RR'NNH_2$ wherein R and R' are defined as above in an unreactive solvent, maintaining at all times a temperature below 50° C., contacting said solution with gaseous sulfur dioxide and recovering said hydrazinesulfinate therein formed from the reaction mixture.

10. A method according to claim 9 wherein R is hydroxy lower alkyl and R' is hydrogen.

11. A method according to claim 9 wherein R and R' are lower alkyl.

12. A method according to claim 9 wherein R is phenyl and R' is hydrogen.

13. A method according to claim 9 wherein R is lower alkyl and R' is hydrogen.

References Cited in the file of this patent

Ephraim et al.: Ber. 44, 386–394 (1911).